Dec. 15, 1959  K. G. GERBER  2,916,764
APPARATUS INCLUDING TUBE FLATTENING ROLLERS
FOR INFLATING TUBULAR FILM
Filed Aug. 23, 1957

INVENTOR
KENNETH GEORGE GERBER

BY Cushman, Darby & Cushman
ATTORNEYS

2,916,764

Patented Dec. 15, 1959

2,916,764

APPARATUS INCLUDING TUBE FLATTENING ROLLERS FOR INFLATING TUBULAR FILM

Kenneth George Gerber, Welwyn Garden City, England, assignor to Imperial Chemical Industries Limited, London, England, a corporation of Great Britain Application August 23, 1957, Serial No. 679,959

Claims priority, application Great Britain August 31, 1956

4 Claims. (Cl. 18—1)

This invention relates to improvements in the manufacture of tubular film from thermoplastic polymers. One particular aspect of the invention relates to the manufacture of oriented tubular film from thermoplastic polymers.

A process commonly used for the manufacture of oriented tubular film comprises extruding a thermoplastic polymeric material in the molten state in the form of tubing, chilling the tubing to a temperature well below its melting point to convert it to a substantially amorphous state, and orienting the tubing by stretching it at a temperature below its melting point, by means of a bubble of fluid enclosed within the tubing. The tubing may be stretched also in the longitudinal direction, either at the same time or separately, by withdrawing the film from a stretching means at a rate greater than the rate of supply to such means. As an additional step, the tubing may be stretched in a similar manner before cooling, while it is in a heat softened state, to reduce its thickness.

It is usually desirable that the oriented film be crystallised after stretching, to stabilise the orientation against changes in temperature; and this may be accomplished by heating the film, usually to a temperature considerably above that at which it was stretched, while holding it under a tension at least sufficient to prevent complete retraction. Thus, tubular film may be oriented by stretching the substantially amorphous tubing by means of a first bubble of fluid enclosed within it by flattening a downstream portion of the tubular film, and afterwards crystallised by re-inflating it to form a second bubble and heating it to the desired temperature while it is so inflated. Since the crystallising temperature is generally much higher than the orienting temperature, the pressure in the second bubble must be substantially less than the pressure in the first bubble to avoid bursting the film at the higher temperature. We have found that the difficulty of providing for the introduction and control of the second bubble of fluid pressure may be overcome by slitting the tubular film along one or more lines beyond the second inflated portion, to enable the fluid to be introduced through this part of the film. However, this does not enable the film to be produced in the finished tubular form that is especially desirable for packaging and certain other applications.

Our copending application, now U.S. Patent 2,862,234, shows that the fluid pressure required to form an inflating bubble, including a crystallising bubble, may be introduced by means of a tubular probe passing from the core of the extruder, through any intervening inflated areas of the film and pairs of nip rolls, and finally into the selected inflating bubble. This method is most easily used when the axis of the desired inflating bubble is in line with the direction of entry of the probe into the film, and it is usually difficult to fulfill this condition for the crystallising step since it means that the entire process of extrusion, cooling, orienting and crystallising must be carried out as a linear process.

Apart from such crystallising processes, there are other occasions when it may be desired to inflate, to different internal fluid pressures, two or more adjacent sections of tubular film separated by an intervening region in which the tubular film is substantially flattened. For example, the first section may be inflated to a relatively high pressure and used for stretching the film, either in the heat softened state or after cooling, and the second section, inflated to a lower internal pressure, used for forming pleats in the tubular film by tucking in sections of the film against the internal fluid pressure; this process may be used for pleating tubular film in oriented or substantially unoriented form.

It is therefore an object of the present invention to provide an improved apparatus by which two regions of a continuously advancing tubular film may be separated from each other by a substantially flattened section and inflated to differing internal fluid pressures. It is a further object to provide an improved means by which a thermoplastic polymeric material may be formed into an oriented, crystallised film that is tubular in its finished form.

In accordance with the present invention, apparatus for reducing a continuously advancing tubular film to a substantially flattened form and for allowing and regulating the passage of fluid through the substantially flattened section of the tubular film from an inflated section of higher internal fluid pressure on one side of said flattened section to an inflated section of lower internal fluid pressure on the other side of said flattened section, comprises rotatable nip rolls adapted to press against opposite sides of a tubular film passing continuously through the nip, and to reduce the film to a flattened form, the roll or roll system on one side of the nip including a means by which a variable pressure may be exerted on the tubular film, said means extending round the circumference of the roll or roll system and across a minor proportion of the width of the film, the remaining part of said roll or roll system being adapted to exert a continuous and substantially uniform pressure upon the tubular film.

The means for exerting a variable pressure may be at any position in relation to the width of the film, but is preferably in the centre or at a fold of the flattened film. In the latter case, it is preferred that similar means be provided at positions in the nip corresponding to both folds of the flattened film.

Our invention further comprises means for inflating two sections of a continuously advancing tubular film to differing internal fluid pressures, said inflated sections being separated from each other by a substantially flattened section, that comprises means for supplying fluid to the inflated section of higher internal fluid pressure and providing and controlling the fluid pressure in the inflated section of lower internal pressure by admitting fluid from said section of higher internal pressure through a portion of limited width of the substantially flattened section of the tubular film.

In accordance with a further feature of the present invention, means for the production from a thermoplastic polymeric material of oriented, crystallised film in finished tubular form, including the continuously operated steps of extruding the material in the molten state in the form of tubing, chilling the tubing to convert it to a substantially amorphous state, orienting the substantially amorphous tubing by stretching it at least in the transverse direction by means of fluid pressure introduced into the tubing, collapsing the oriented tubular film to a substantially flattened state, reinflating the film beyond the flattened section by internal fluid pressure that is less than the pressure used for stretching the substantially amorphous tubing, controlling the said lesser internal pressure by means of fluid admitted through a section of limited width of the substantially flattened section of the tubular film from the orienting region of greater internal fluid pressure, heating the film so reinflated to crystallise it and stabilise the molecular orientation therein, and finally reducing the oriented, crystallised film to a flattened, tubular form.

Particular forms of apparatus according to the present invention are shown in the accompanying drawings, in which.

Figure 1:
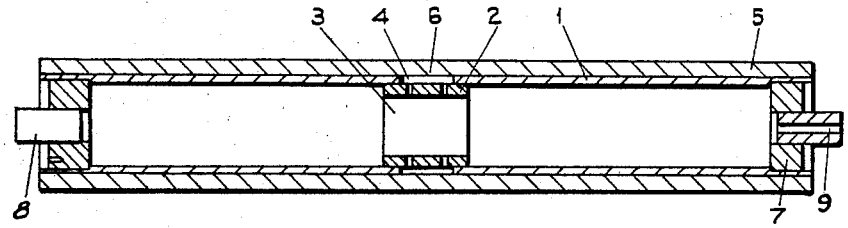
Figure 1 shows a roll having at its centre a section adapted to exert a variable pressure upon the tubular film passing through the nip, this roll thus being adapted to form one side of a nip roll system for use in accordance with the invention.

In Figure 1, a 4" diameter roll, 24 ins. long, is constructed from two sections of steel tubing, 1, of 2$^{15}/_{16}$ ins. outside diameter, welded to an inner section of steel tubing, 2. The ends of the outer tube sections are separated from each other by a distance of 1½ ins., and the inner tube section is provided with two rows of 8 holes, ⅛ in. diameter and equally spaced round the circumference of the tube section, providing communication between the centre of the tube section, 3, and the space, 4, between the outer tube sections. The outer tube sections and the space 4 are covered by a ½ in. thick continuous rubber coating, 5, which fits closely round the outer tube sections and at 6 crosses the space 4. The roll is provided with closures, 7, welded to the ends of the outer tube sections, and with shafts, 8, one of which is bored at 9 for connection through a 2-way tap to a vacuum pump and to high pressure air.

In operation, the roll of Figure 1 is used with a driven nip roll of conventional type, and the pressure exerted on the film passing through the nip is adjusted by adjusting the air pressure within the hollow roller. It will be appreciated that the rubber at 6 tends to bow into the space 4, and therefore that a pressure within the roller greater than the maximum pressure within the film will usually be needed to prevent the flow of air from one side of the nip to the other.

Figure 2:
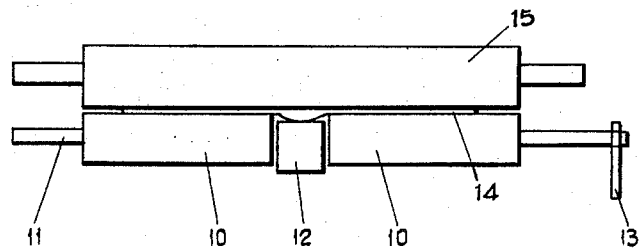
Figure 2 shows diagrammatically an alternative arrangement in which one side of the nip is formed by a pair of rolls separated by a means adapted to exert a variable pressure.

In the apparatus of Figure 2, one side of the nip is formed by two idler half rolls, 10, rotatably mounted on a shaft, 11, and separated from each other by a cylindrical leak member, 12, which revolves on ball bearings round an eccentric mounted upon or forming a part of the shaft 11. 13 is a lever by which the shaft 11 may be turned to adjust the position of the eccentric with respect to the nip, and hence to control the depth of the aperture in the centre of the flattened film, 14, passing through the nip, and the amount of fluid passing therethrough. 15 is a driven roll of uniform diameter.

Figure 3:
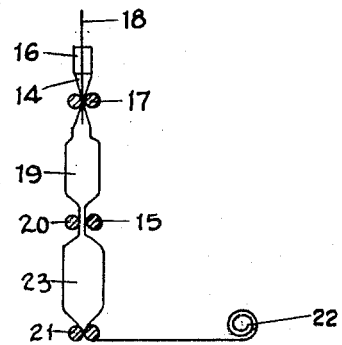
Figure 3 shows the position of such nip rolls in an integrated process for the extrusion, cooling, orienting, crystallising and winding of tubular film.

In Figure 3, 14 represents the tubular film, which is being received from an extruder and cooling system. 16. 17 is a pair of nip rolls adapted as described in said U.S. Patent 2,862,234 for a tubular probe, 18, to pass between them to introduce fluid for the inflation of the section 19 of the film; and 15 and 20 represent respectively the driven roll and modified roll of nip rolls constructed in accordance with the present invention, for example as shown in Figures 1 or 2. Between these two nip roll systems the tubular film is stretched in the inflated section 19, by enclosed fluid pressure, usually air, the film being heated in the upper part of this section to the desired stretching temperature. It may simultaneously be stretched in the machine direction by the roll 15 being driven at a greater peripheral speed than the rolls 17. 21 are nip rolls between which the film passes to the wind-up, 22. Between the rolls 15 and 21 a second inflated section, 23, is formed by admission of a controlled amount of air or other fluid from the bubble 19 by the means hereinbefore described. This section 23 is heated to the desired crystallising temperature while the internal pressure is adjusted to and maintained at a value less than that of the stretching pressure within the film at 19, by suitable adjustment of the nip roll "leak" section as hereinbefore described. The pressure at 23 is generally just sufficient to prevent shrinkage or to allow only slight shrinkage of the tubular film in this region. Idler rolls in echelon formation may be provided above and below the nip rolls 15 and 20, and above the nip rolls 21, to assist in the gradual flattening or inflation of the film. The required fluid pressure is introduced into and maintained in the section 19 of the tubular film by means of the tubular probe, which passes through the core of the extruder, through the cooling section of the film and finally between the nip rolls 20 and 15, as described.

It will be appreciated that many modifications may be made in the apparatus particularly described, without departing from the scope of the present invention. In particular, other means may be devised for controlling the amount of fluid passing through the flattened section of the film. For example, the eccentric section of the rolls of Figure 2 may be replaced by a resilient, inflatable member to exert the required variable pressure upon the flattened tubular film; or, as stated hereinbefore, instead of a single means for exerting variable pressure at the centre of the film, such means may be provided at both folds of the flattened film.

It will also be appreciated that although the process of the invention as particularly described is primarily to produce oriented film in finished tubular form, the film may nevertheless be slit, if desired, beyond the crystallizing bubble, and wound as one or more lengths of flat film. Moreover, although the invention has been described with particular reference to the crystallising of oriented film, the same principles of operation may be applied to other processes involving the inflation by differing internal fluid pressures of two or more sections of continuously advancing film, for example for pleating processes as already mentioned.

The apparatus of the present invention will usually be capable of preventing, as well as controlling, the flow of fluid through the substantially flattened section of the film; and in some cases it may be found that the escape of fluid from the further end of the inflated section may be so slow as to allow the entry of fluid to be cut off, and the pressure adjusted only intermittently. This applies particularly to the process illustrated by Figure 3, in which it is undesirable for any air to be allowed to remain in the film beyond the nip rolls 21; therefore, once the desired pressure is established in the section 23 of the film, it will usually be necessary to prevent any further flow of air through the "leak" section of the nip roll 20. Intermittent adjustment may however be necessary to compensate for slight losses past the nip rolls or through faults in the film. In other cases, particularly when the film is slit, leakage at the further end will be sufficient for the continuous admission of air through the "leak" section of the nip rolls to be required.

Thermoplastic polymeric materials that may be formed into or treated in the form of tubular film by the processes of the present invention include, for example: linear aromatic polyesters of high molecular weight, such as polyethylene terephthalate; nylon; polythene; polypropylene; polyvinyl chloride; polyvinylidene chloride; vinyl chloride/vinylidene chloride copolymers; and rubber hydrochloride. Because of the particular suitability of polyethylene terephthalate tubular film for use as a packaging material, and because of the succession of process steps used in its production, the invention is of particular value for the production of polyethylene terephthalate film in oriented tubular form.

I claim:

1. Apparatus for reducing a continuously advancing tubular film to a substantially flattened form and for allowing and regulating the passage of fluid through the substantially flattened section of the tubular film from an inflated section of higher internal fluid pressure on one side of said flattened section to an inflated section of lower internal fluid pressure on the other side of said flattened section, comprising a co-acting pair of rotatable nip rolls, and means for displacing an annular section of one of said nip rolls relative to an adjoining section of said one roll, whereby the effective pressure exerted by said displaceable roll section toward the co-acting nip roll may be varied.

2. Apparatus as defined in claim 1, wherein said displaceable roll section is substantially midway the length of said one nip roll.

3. Apparatus as defined in claim 1, wherein said displaceable roll section includes a resilient tubular member enclosing a cavity, and including means in communication with said cavity for varying the fluid pressure in the interior of said resilient tubular member.

4. Apparatus as defined in claim 1, wherein said one roll includes a shaft, an eccentric fixedly mounted on said shaft substantially midway its length, outer roll sections rotatably mounted on said shaft on either side of said eccentric, and a central roll section rotatably mounted on said eccentric, and means for rotating said shaft and eccentric to vary the position of said central roll section with respect to the co-acting roll.

References Cited in the file of this patent

UNITED STATES PATENTS

| | | |
|---|---|---|
| 1,949,650 | Lindas | Mar. 6, 1934 |
| 2,401,798 | Reichel | June 11, 1946 |
| 2,423,260 | Slaughter | July 1, 1947 |
| 2,433,937 | Tornberg | Jan. 6, 1948 |
| 2,616,128 | Barry et al. | Nov. 4, 1952 |
| 2,688,773 | McIntire | Sept. 14, 1954 |
| 2,780,889 | Fulk | Feb. 12, 1957 |